UNITED STATES PATENT OFFICE.

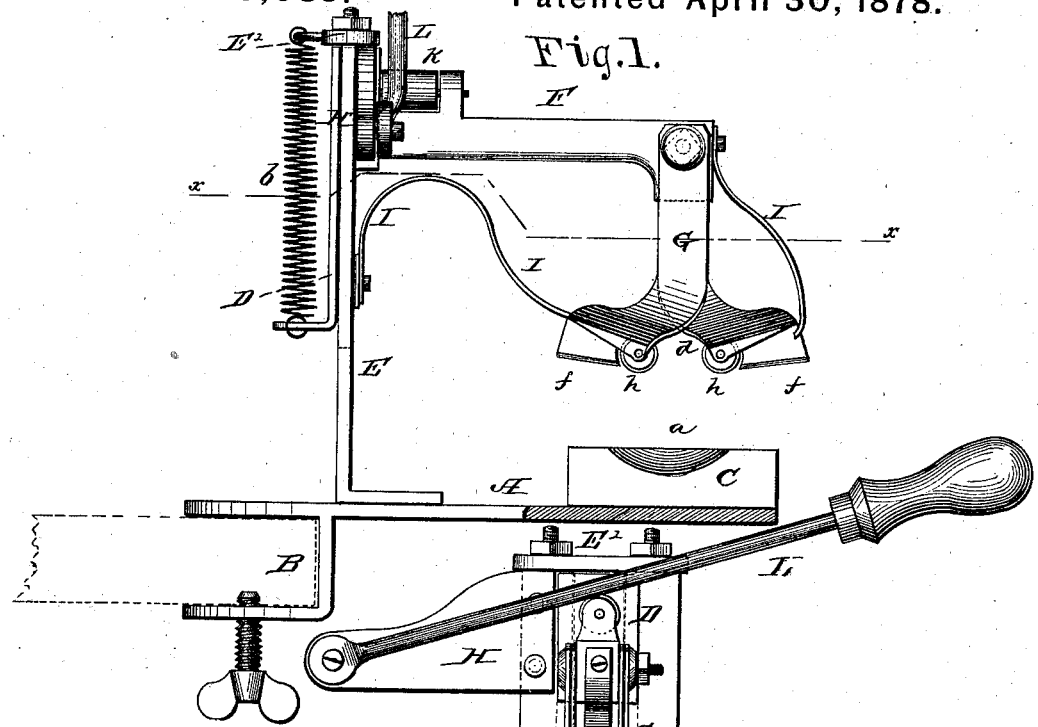

JAMES H. SMITH, OF MONTICELLO, ARKANSAS.

IMPROVEMENT IN PEACH-CUTTERS.

Specification forming part of Letters Patent No. 203,085, dated April 30, 1878; application filed April 6, 1878.

*To all whom it may concern:*

Be it known that I, JAMES H. SMITH, of Monticello, in the county of Drew and State of Arkansas, have invented certain new and useful Improvements in Peach-Cutters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a machine for dividing a peach in two parts and removing the stone from the same, as will be hereinafter more fully set forth.

In the annexed drawing, to which reference is made, and which fully illustrates my invention, Figure 1 is a side elevation of my peach-cutter. Fig. 2 is a front view, and Fig. 3 a plan view, of the same. Fig. 4 is an enlarged perspective view of one of the cutters.

A represents the bed-plate of my machine, provided at the inner end with a clamp, B, for attachment to a bench or table.

On the outer end of the bed-plate A are fastened two wooden blocks, C C, a suitable distance apart, and having their inner edges hollowed out on top, as shown at $a$ in Figs. 1, 2, and 3.

On the inner end of the bed-plate A are secured two parallel standards, E E, connected at the top by a cap, E', and between these standards moves a vertical slide, D, which is held up against the cap E' by a spiral spring, $b$. The slide D is provided with a forwardly-extending arm, F, at the outer end of which are pivoted the two cutters G G. The main portion of each cutter is somewhat in the form of a boot, the vertical part being open in front and rear, and one closing within the other. Each cutter forms two curved cutting-edges, $d$ $d$, and at the junction of these two cutting-edges is inserted a circular or rolling cutter, $h$, and a straight cutter, $f$, extends outward from said circular cutter.

I I are springs, arranged in any convenient manner so as to throw the two cutters G G inward toward each other.

To an arm, H, projecting from one of the standards E, is pivoted the operating-lever L, which lies across the inner end of the arm F. At this point in the arm F is mounted a roller, $k$, against which the lever L works so as to avoid friction.

By pressing down on the lever L the arm F is depressed, so that the cutters G G will divide the peach in two parts and remove the stone. The peach is laid on the concave supports C C, and as the cutters descend the curved edges $d$ commence to divide the same, the circular cutters $h$ also cutting into the peach, and as they strike the stone they roll thereon, so as to spread the cutters over the stone, the straight edges $f$ cutting the ends of the peach. As the circular cutters pass over the ends of the stone the springs I close the cutters, so as to follow the shape of the stone and entirely separate the stone from the peach, which latter is divided in two pieces. The stone remains held within the cutters G, and is expelled by the next stone in operating upon a second peach. As soon as the pressure is removed from the lever L the spring $b$ raises the parts up again.

Having thus fully described my invention, what I claim as new, and desire to secure by Letters Patent, is—

1. The combination of the standards E E, secured to a bed-plate, A, the slide D, with arm F, and the cutters G G, with springs I I, substantially for the purposes set forth.

2. The operating-lever L, pivoted to the arm H, in combination with the arm F and the roller $k$ mounted thereon, for the purposes herein set forth.

In testimony that I claim the foregoing as my own I have hereto affixed my signature in presence of two witnesses.

JAMES H. SMITH.

Witnesses:
JAMES K. WELLS,
T. H. MATTHEWS.